July 31, 1956  J. H. BORNZIN ET AL  2,756,557
PICK-UP DEVICE WITH DRIVEN SWEEPING RAKES
Filed April 2, 1953  2 Sheets-Sheet 1

INVENTORS
JAMES H. BORNZIN
HOWARD F. BARDWELL
Paul O. Pippel
ATTY.

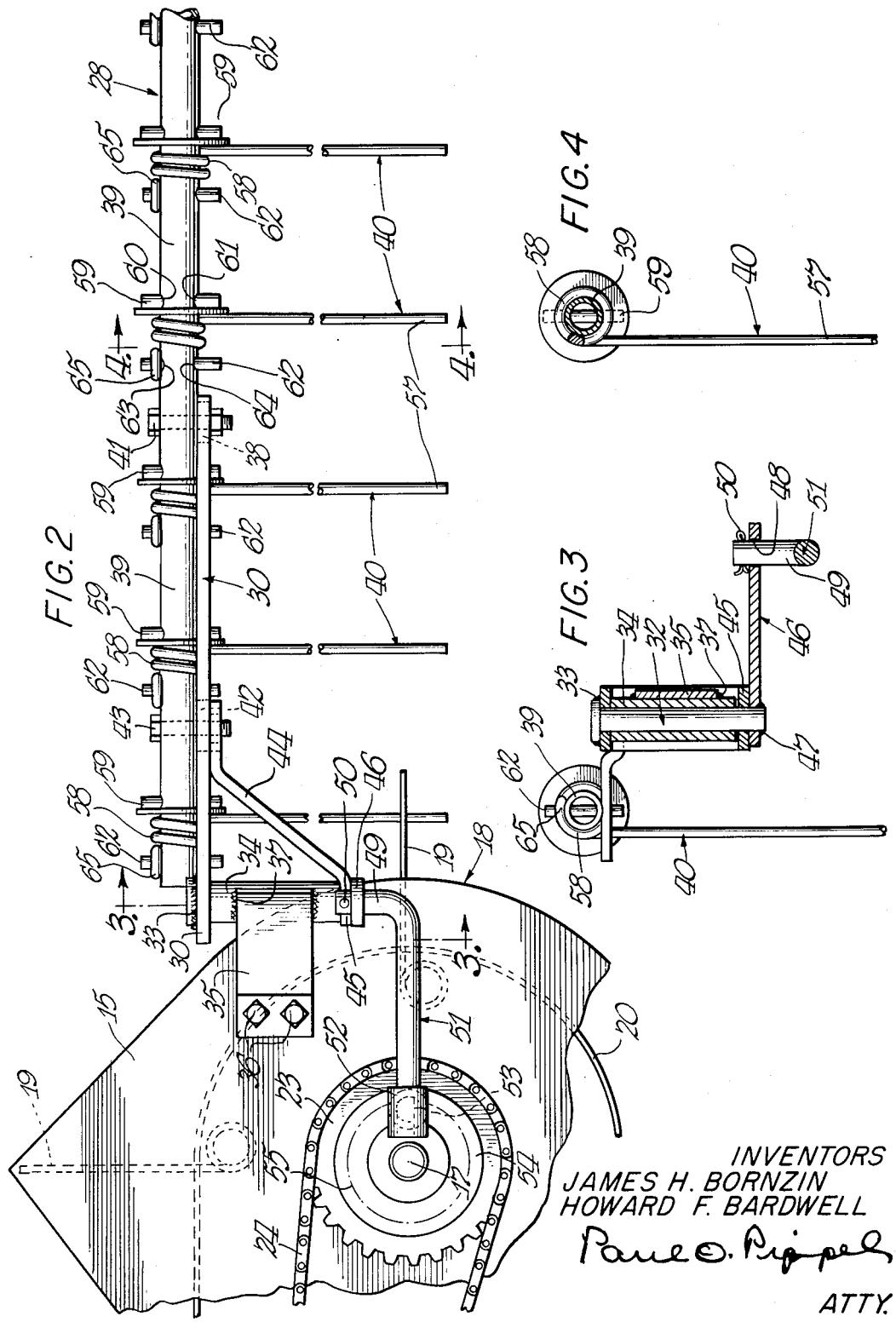

United States Patent Office 2,756,557
Patented July 31, 1956

2,756,557

PICK-UP DEVICE WITH DRIVEN SWEEPING RAKES

James H. Bornzin and Howard F. Bardwell, Memphis, Tenn., assignors to International Harvester Company, a corporation of New Jersey Application April 2, 1953, Serial No. 346,332

1 Claim. (Cl. 56—364)

This invention relates to swinging rakes for agricultural implements.

Agricultural implements and more particularly harvesting implements very often employ pick-up means for gathering a crop which has previously been windrowed. Very often these windrows of hay or other crop material are of various widths and sometimes sufficiently irregular in positioning that a normal width pick-up on a harvesting machine for example is not capable of gathering all of the crop. To enlarge or lengthen the pick-up in order to completely gather an irregular windrow would be impractical and uneconomical.

It is, therefore, a principal object of this invention to provide means associated with a harvester pick-up for converging a relatively wide and irregularly positioned windrow into a narrow path for direct feeding into the harvester pick-up.

Another important object of this invention is the provision of a cylinder type pick-up on harvesting implements having diverging rakes projecting outwardly and forwardly from the lateral side edges of the harvester pick-up for the purpose of causing a windrowed crop to be converged centrally toward the harvesting pick-up.

Another and further important object of this invention is to supply oscillating rake members extending angularly outwardly from the sides of a harvesting pick-up cylinder for the purpose of sweeping a windrowed crop into a relatively narrow straight, and uniform path for the easy receipt of the crop in its entirety by the harvesting cylinder pick-up.

Still another important object of this invention is to provide divergingly disposed ground rakes on the forward end of a windrow harvester arranged and constructed to regularly swing inwardly and outwardly in such manner that the windrow being harvested is narrowed and straightened for easy handling by the regular harvesting elements.

Other and further objects and advantages of this invention will become apparent from the disclosures in the following specification and accompanying drawings.

In the drawings:

Fig. 2 is an enlarged fragmentary end view of the device taken on the line 2—2 of Fig. 1;

Fig. 3 is a sectional view taken on the line 3—3 of Fig. 2, and

Fig. 4 is a sectional view of one of the rake tines of this invention as taken on the line 4—4 of Fig. 2.

As shown in the drawings:

Figure 1:
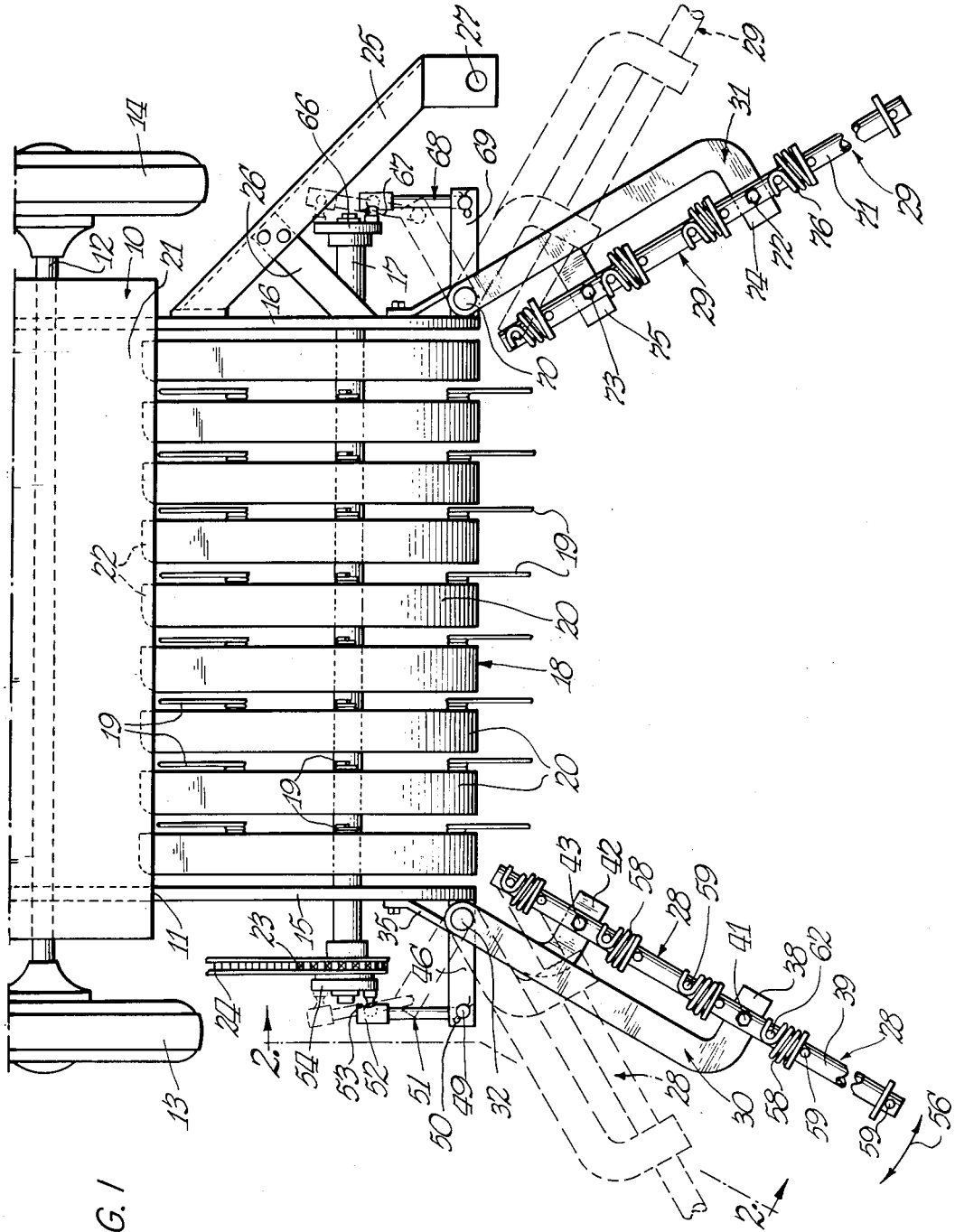
Fig. 1 is a top plan view of a windrow harvesting implement having the swinging rakes of this invention mounted thereon.

The reference numeral 10 indicates generally a harvesting implement such as a hay baler, windrow harvester, forage harvester, harvester thresher, etc. The havester 10 is provided with a frame structure 11 carried on a cross shaft or axle 12 which in turn is mounted on spaced apart wheels 13 and 14. The harvester is thus portable in nature and is capable of traversing a field for picking up a crop to be harvested.

The frame supporting structure 11 is equipped with laterally spaced apart forwardly projecting rigid arms 15 and 16. Intermediate the ends of the arms there is journalled therein a cross shaft 17 which lies generally parallel to the wheel carrying axle shaft 12. A pick-up cylinder 18 is mounted on the shaft 17 and by reason of the spring carried fingers 19 extending radially outwardly therefrom a cut crop may be picked from the ground and carried upwardly and rearwardly over a deck composed of a plurality of spaced apart leaf members 20 between which the radially extending fingers pass. The leaf members 20 are stationary and extend in a circular path around the cylinder 18 and thence rearwardly to a position over-lying a receiving platform 21 on the harvester as shown at 22. This cylinder pick-up attachment is of ordinary construction and has been in commercial use for many years. An examination of the pick-up shows that its ability to gather cut crops is limited in width to the width of the cylinder 18. In other words if the windrow of crop were wider than the pick-up 18 a portion of that crop would be lost or at least not gathered into this harvesting mahcine upon one passage of the machine over the field.

A sprocket 23 is fixedly mounted on the shaft 17 spaced outwardly from the supporting arm 15 and by means of a chain 24 driven by means (not shown) from the harvesting implement 10 rotary motion is imparted to the shaft 17 and thus also to the pick-up cylinder 18. Forwardly projecting arm 16 is equipped with an angularly positioned auxiliary frame member 25 which is braced by a member 26 and is provided at its forward end with a vertical opening 27 for the purpose of receiving a pin or the like (not shown) for attachment to the drawbar of a tractor or other pulling vehicle (not shown). There is thus provided a harvesting machine capable of passing over a field and picking up crops from windrows and carrying these crops upwardly and over the cylindrical pick-up attachment 18 for delivery into the harvesting machine 10 for subsequent treatment.

In order that the pick-up attachment of this harvester 10 be capable of handling a wider windrow and/or very irregularly positioned windrows, there is provided on the forward extensions of each of the fixed arms 15 and 16, which constitute the lateral side extensions of the pick-up cylinder 18, divergingly disposed rake members 28 and 29. The rake members each include a supporting frame structure as shown at 30 and 31 respectively which are journalled for oscillating swinging movement with respect to the frame supporting structure of the harvesting machine. As shown in the detailed views of Figures 2 and 3 the frame member 30 of the rake 28 has a vertically depending pin 32 welded as shown at 33 to one end of the frame arm 30. The pin 32 projects downwardly within a sleeve supporting member 34 which as shown in Figures 1, 2 and 3 is fixedly carried by a bracket 35. The bracket 35 is bolted or otherwise fastened at 36 to the forwardly projecting arm 15 and is weldably attached as at 37 to the vertically disposed fixed sleeve member 34. The outer end of the frame arm is turned at a right angle as shown at 38 for passage beneath a tubular rod member 39. The rod 39 carries a plurality of spaced apart spring mounted rake teeth or tines 40. The tubular rod member 39 is fixedly attached to the end member 38 of the frame arm 30 by reason of a bolt 41. As best shown in Figure 1 an intermediate projection 42 is provided on the frame arm 30 parallel to the end turned portion 38 and in general alignment therewith. The projection 42 passes beneath the rake rod 39 and is bolted thereto as shown at 43. A bracing or reinforcing member 44 is journally mounted about the pin 32 as shown at 45 and extends outwardly and thence upwardly to a position immediately below and adjacent the frame arm 30 where it is welded or otherwise fastened to make a unitary rake structure.

A link member 46 is welded as shown at 47 to the lower end of the pin 32 which as previously stated is welded to the frame arm 30. It will thus be apparent that the link member 46 is integral with the rake 28 and moves concurrently with the rake. The outer end of the link member 46 is provided with an opening or hole 48 through which a rod member 49 loosely passes. A cotter pin 50 projects through and is fastened to the upper end of the rod 49 thus holding the rod in its assembled relationship with the link member 46. The vertically disposed rod 49 is an upwardly bent end portion of a main rod 51 which as shown in Fig. 2 is horizontally disposed and extends rearwardly toward the harvester 10. A box-like member 52 is mounted on the rearward end of the rod 51 and is adapted to act as a crank carrying member. A crank pin 53 is mounted for universal ball and socket engagement within the box member 52 at its outer end and is carried on a disc member 54 which is fixedly mounted on the rotating shaft 17. Thus as the disc 54 rotates the crank pin 53 will move circularly about an annular path 55 as shown in Figure 2. The resultant movement of the rod 51 occasioned by the rotational movement of the crank pin 53 is a generally fore and aft movement which by reason of the upward extension 49 engaging the link member 46 causes a like fore and aft movement of the link member 46 and thus also an inward and outward swinging or oscillating movement of the rake member 28 about its hinge pin 32. The oscillating direction of movement is shown by the arrow 56. In order that the device may be more fully understood the rake member 28 is shown in dash lines in Figure 1 in its outermost position and in full lines in its innermost position thus clearly indicating the range and extent of oscillating movement. When the rake member 28 is in the position as shown in dash lines in Figure 1, the effective extent of the harvesting machine is considerably increased in width so that a wide or irregularly positioned windrow may be easily gathered and moved centrally between the rake members 28 and 29 by a gentle sweeping of the crop on the ground by the rake toward the central position between the rakes. The rake tines 40 are shown in detail in Figure 4. The tine generally includes a ground dragging portion 57 and a helically wrapped portion 58 surrounding the tubular rake rod 39. The tine unit 40 is maintained in relatively fixed lateral position on the rod 39 between a vertical pin 59 which is press fitted through aligned openings 60 and 61 in the rod 39 and a spaced apart pin 62 which is press fitted in spaced apart aligned openings 63 and 64 in the rod 39. The helically wrapped portion 58 of the tine 40 constitutes a spring through and about which the ground engaging portion 57 may yield as it drags and scrapes the ground. Further, a laterally bent end portion 65 of the spring portion 58 is bent laterally for engagement with the pin 62 thus prohibiting the rake tooth from turning freely about the rod 39. It should be understood that when the rakes are swung inwardly in a raking stroke the tines 40 have their bent end portions 65 abutting the pin 62 and thus the tines are held in extended or raking position. However, during the return or outward swinging of the rakes it is not necessary or desirable to sweep material out from the path of the pick-up and thus the tines are permitted to freely turn about their supporting rod to ride over the top of any hay or other material. When the next inward raking stroke is made the tines fall and back pressure of the hay being swept causes the bent end portions to again abut the stop pins 62.

The swinging rake member 29 is constructed in the same manner as the swinging rake 28 and similarly receives its drive from the driven shaft 17. A disc 66 is fastened to the end of the shaft 17 opposite the disc 54 and a crank pin 67 thereon is adapted to cause reciprocation of a rod 68 which is comparable to the rod 51. It should be understood that the members 51 and 68 constitute pitmans which convert the rotary motion of the disc 66 to a fore and aft movement of link members for effecting swinging movement of the rakes 28 and 29. A link 69 corresponds to the link 46 on the other side of the pick-up and is adapted to effect oscillating movement of a vertically disposed pin 70 which corresponds to the pin 32 for the rake 28. The frame arm 31 is welded or otherwise fastened to the pin 70 and thus movement of the link 69 is directly imparted to the frame arm 31 through the pin 70. The rake member 29 as stated is identical in construction to the rake member 28 and includes a tubular rod 71 which is fastened by means of bolt members 72 and 73 to projecting portions 74 and 75 of the frame arm 31. The rod 71 is equipped with downwardly extending spring rake tines 76 corresponding to the rake tines 40. As shown in Figure 1 the rake member 29 is also shown in dash lines to correspond to the dash line position of the rake 28 wherein both of the rakes are wide spread. The rakes are preferably arranged in timed driving relationship with one another so they swing outwardly and inwardly simultaneously.

In operation the harvester or other agricultural implement having the converging mechanism of this invention mounted on the forward end thereof is propelled through a field having crops in windrows thereon. The pick-up cylinder 18 rotates upwardly and rearwardly so that the crop from a windrow is carried over the top of the pick-up cylinder and is guided back onto the platform 21 of the harvesting machine 10. The constant means for driving this cylinder pick-up also imparts drive to the rakes for their oscillating or swinging movement in unison alternately inwardly and outwardly. This swinging movement of the rake members 28 and 29 sweeps wide windrows into a narrow central path and/or straightens irregularly placed windrows into an aligned central narrow path whereafter the intermediately and centrally disposed pick-up cylinder 18 may easily and conveniently take hold of the crop and deliver it to the harvesting machine.

Numerous details of construction may be varied throughout a wide range without departing from the principles disclosed herein and we therefore do not propose limiting the patent granted hereon otherwise than as necessitated by the appended claim.

What is claimed is:

A windrow converging mechanism for a harvester with a transversely disposed pick-up having a rotating member thereon comprising a frame supporting structure, a pair of diverging ground sweeping rakes, said rakes journally mounted for arcuate horizontal swinging movement at the lateral opposed ends of the transversely disposed pick-up, and driving and linkage means joining said rotating member with said diverging rakes for oscillatably swinging said ground sweeping rakes alternately inwardly and outwardly, and said driving and linkage means including a crank on said rotating member, a pitman engaging said crank, and bell-crank means on said rakes rocked by said pitman to oscillate said rakes.

References Cited in the file of this patent

UNITED STATES PATENTS

| | | |
|---|---|---|
| 39,655 | Hubbell | Aug. 25, 1863 |
| 741,111 | Colbert | Oct. 13, 1903 |
| 852,269 | Grant | Apr. 30, 1907 |
| 1,806,875 | Grafmiller | May 26, 1931 |
| 1,877,770 | Larson | Sept. 20, 1932 |
| 2,627,714 | Freeman et al. | Feb. 10, 1953 |